US009076496B2

(12) United States Patent
Ashikawa (10) Patent No.: US 9,076,496 B2
(45) Date of Patent: Jul. 7, 2015

(54) TAPE CLEANING DEVICE AND DRIVE DEVICE (71) Applicant: FUJIFILM CORPORATION, Minato-ku, Tokyo (JP)

(72) Inventor: Teruo Ashikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/521,486

(22) Filed: Oct. 23, 2014

(65) Prior Publication Data

US 2015/0043104 A1 Feb. 12, 2015

Related U.S. Application Data (63) Continuation of application No. PCT/JP2013/062492, filed on Apr. 26, 2013.

(30) Foreign Application Priority Data

May 1, 2012 (JP) ................................. 2012-104736

(51) Int. Cl.
G11B 23/50 (2006.01)
G11B 19/26 (2006.01)

(52) U.S. Cl.
CPC .............. *G11B 23/502* (2013.01); *G11B 23/50* (2013.01); *G11B 19/26* (2013.01)

(58) Field of Classification Search
USPC ...................................................... 360/130.2
See application file for complete search history.

(56) References Cited

U.S. PATENT DOCUMENTS

| 3,616,478 | A | * | 11/1971 | Martz et al. ..................... 15/93.1 |
| 3,745,602 | A | * | 7/1973 | Beistle ............................. 15/308 |
| 3,978,546 | A | * | 9/1976 | Epina et al. ................... 15/309.1 |
| 4,010,514 | A | * | 3/1977 | Fischer et al. ............... 15/309.1 |
| 5,655,252 | A | | 8/1997 | Miyawaki et al. |
| 6,176,245 | B1 | * | 1/2001 | Takahashi et al. ........ 134/122 R |
| 6,231,679 | B1 | * | 5/2001 | Mandai et al. ..................... 134/6 |

FOREIGN PATENT DOCUMENTS

| JP | S52-151721 U | 11/1977 |
| JP | S58-087193 U | 6/1983 |
| JP | H02-149180 U | 12/1990 |
| JP | H04-017182 A | 1/1992 |
| JP | H06-43817 U | 6/1994 |
| JP | H08-152690 A | 6/1996 |
| JP | 2006-048752 A | 2/2006 |

(Continued)

OTHER PUBLICATIONS

International Search Report issued in International Application No. PCT/JP2013/062492 on Jul. 16, 2013.

(Continued)

*Primary Examiner* — Wayne Young
*Assistant Examiner* — Carlos E Garcia
(74) *Attorney, Agent, or Firm* — Solaris Intellectual Property Group, PLLC (57) ABSTRACT

A tape cleaning device includes a blade that, while touching a recording tape that is running, scrapes foreign bodies from the recording tape; a roller that touches the recording tape and rotates along with the running of the recording tape, the foreign bodies scraped off by the blade being transferred to the roller; and a removal mechanism that removes the foreign bodies that have been transferred to the roller from the roller.

10 Claims, 7 Drawing Sheets

(56) References Cited

FOREIGN PATENT DOCUMENTS

| JP | 2009-043392 A | 2/2009 |
|----|---------------|--------|
| JP | 2012-033238 A | 2/2012 |

OTHER PUBLICATIONS

Written Opinion of the ISA issued in International Application No. PCT/JP2013/062492 on Jul. 16, 2013.

English language translation of the following: Office action dated Feb. 17, 2005 from the JPO in a Japanese patent application corresponding to the instant patent application. This office action translation is submitted now in order to supplement the understanding of patent document JP H06-43817 and JP H08-152690 which are cited in the office action and is being disclosed in the instant Information Disclosure Statement.

* cited by examiner

TAPE CLEANING DEVICE AND DRIVE DEVICE

CROSS-REFERENCE TO RELATED APPLICATIONS

This application is a continuation application of International Application No. PCT/JP2013/062492, filed on Apr. 26, 2013, which is incorporated herein by reference. Further, this application claims priority from Japanese Patent Application No. 2012-104736, filed on May 1, 2012, the disclosure of which is incorporated by reference herein in their entirety.

BACKGROUND OF THE INVENTION

1. Field of the Invention

The present invention relates to a tape cleaning device and a drive device.

2. Related Art

A tape device has been known heretofore (for example, see Japanese Patent Application Laid-Open (JP-A) No. 2009-43392) in which a suction aperture is formed at a face of a guide body against which a tape slides, the guide body being disposed to oppose a running path of the tape. The suction aperture communicates between a suction cavity that is set to a vacuum pressure and the exterior space. Thus, dust adhering to the surface of the tape is suctioned through the suction aperture and removed.

However, in the tape device described in the above document, because the dust adhered to the surface of the tape is suctioned and removed through the suction aperture that is sliding and contacting against the surface of the tape, the suction force may have adverse effects on running of the tape.

SUMMARY

Accordingly, the present invention provides a tape cleaning device that may clean a recording tape without having adverse effects on running of the recording tape, and provides a drive device equipped with the tape cleaning device.

A first aspect of the present invention is a tape cleaning device including: a blade that, while touching a recording tape that is running, scrapes foreign bodies from the recording tape; a roller that touches the recording tape and rotates in conjunction with the running of the recording tape, and that is structured to receive the foreign bodies scraped off by the blade and being transferred to the roller; and a removal mechanism that removes, from the roller, the foreign bodies that have been transferred to the roller.

According to the first aspect of the present invention, foreign bodies that are scraped from the running recording tape by the blade are transferred to the roller that is rotating along with the running of the recording tape. The foreign bodies that have been transferred to the roller are removed from the roller by the removal mechanism. Thus, the removal mechanism does not directly act on the running recording tape. Therefore, the recording tape may be cleaned without adverse effects on running of the recording tape.

In the first aspect, the removal mechanism may include an adhesive roller that, while touching the roller and rotating, removes the foreign bodies on the roller by adhesive force.

According to this configuration, the foreign bodies transferred to the roller may be removed efficiently.

In the above configuration, the adhesive roller may be structured so as to rotate in conjunction with the rotation of the roller.

According to this configuration, the foreign bodies transferred to the roller may be removed efficiently by a simple structure.

The above configuration may further include a housing in which the blade, the roller and the adhesive roller are disposed.

According to this configuration, foreign bodies that have been removed from the roller by the adhesive roller may be prevented from leaking to the outside from the interior of the housing.

In the first aspect, the removal mechanism may include a suction portion that forms a suction space between the suction portion and the roller and that removes the foreign bodies on the roller by suction force, the suction portion being communicated with a suction device.

According to this configuration, the foreign bodies transferred to the roller may be removed efficiently.

A second aspect of the present invention is a drive device including: a head that, while touching a recording tape that is running, implements at least one of writing or reading of information at the recording tape; a tape drive mechanism that causes the recording tape to run in reciprocal directions; and, the tape cleaning device of the first aspect, disposed at least at one side of the head in the recording tape running directions.

According to the second aspect of the present invention, the recording tape may be cleaned without adverse effects on running of the recording tape.

In the second aspect, the tape drive mechanism may include the tape drive mechanism includes a pair of reels that retain the recording tape so as to be capable of feeding out and taking up the recording tape, the pair of reels being non-removably incorporated in a main body of the drive device.

According to this configuration, in a drive device in which a pair of reels are non-removably incorporated, the recording tape may be cleaned without adverse effects on running of the recording tape.

In the second aspect, the tape cleaning device may be provided at both sides of the head.

According to this configuration, a mechanism that cleans the head may not be necessary. Therefore, costs may be reduced.

In the second aspect, the tape cleaning device may be detachable from a main body of the drive device.

According to this configuration, the tape cleaning device may be replaced.

As described hereabove, according to the aspects of the present invention, a recording tape may be cleaned without adverse effects on running of the recording tape.

BRIEF DESCRIPTION OF THE DRAWINGS

Exemplary embodiments will be described in detail based on the following figures.

DETAILED DESCRIPTION

Figure 1:
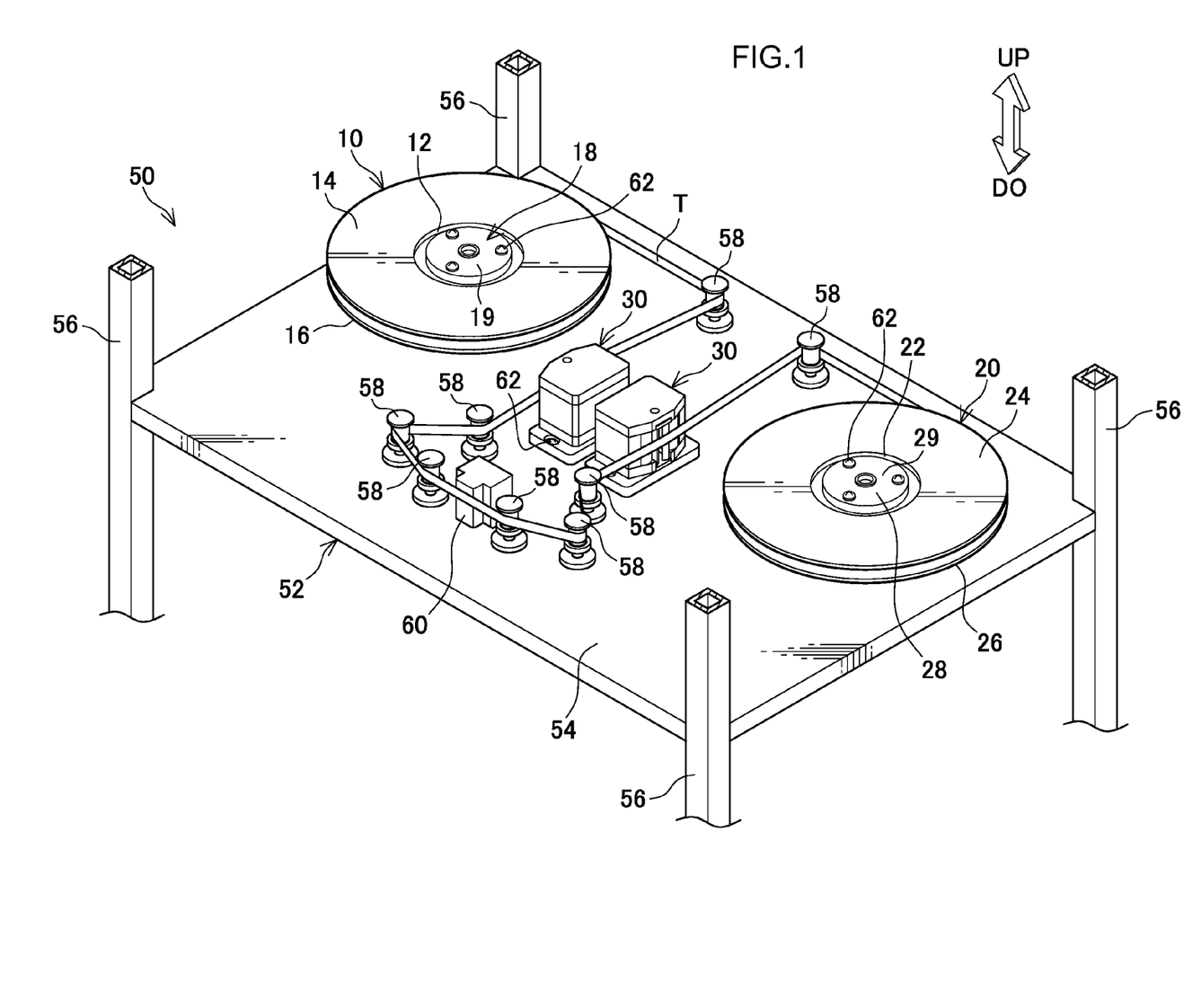
FIG. 1 is a perspective view showing a pair of reels that are non-removably incorporated in a drive device, and a tape cleaning device.
Figure 2:
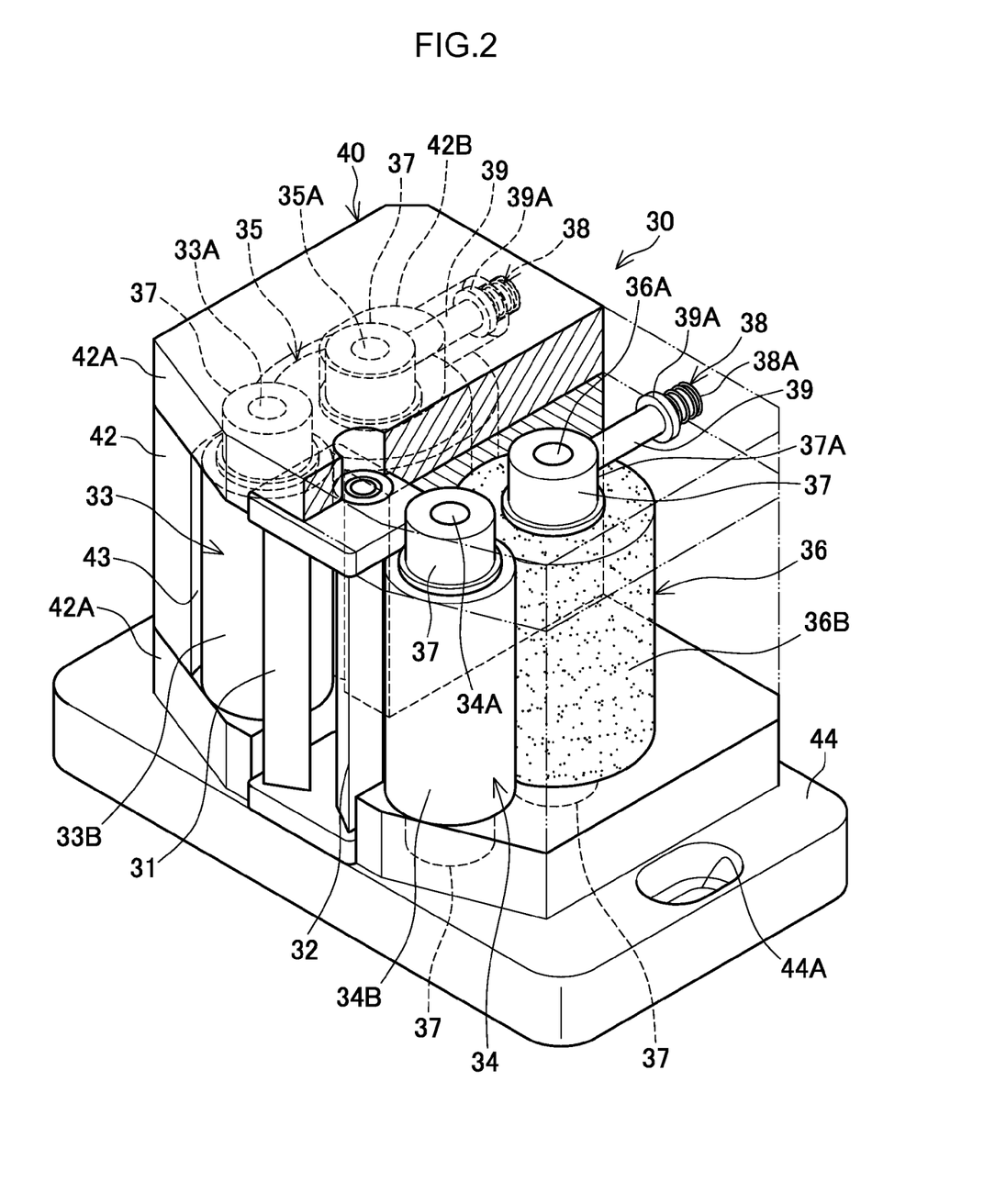
FIG. 2 is a perspective view showing structures of a tape cleaning device of a first exemplary embodiment.
Figure 3:
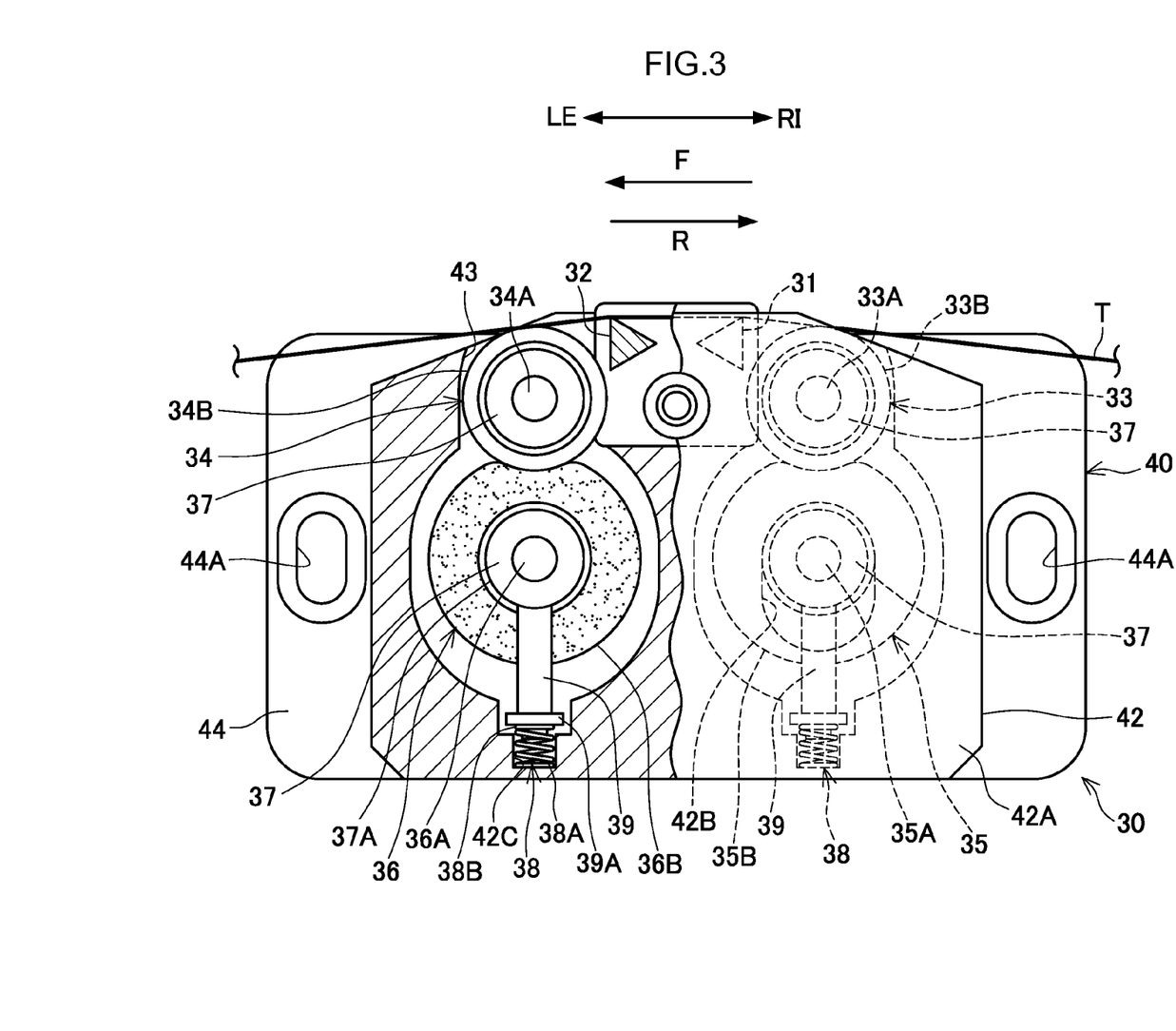
FIG. 3 is a plan view showing the structures of the tape cleaning device of the first exemplary embodiment.
Figure 4:
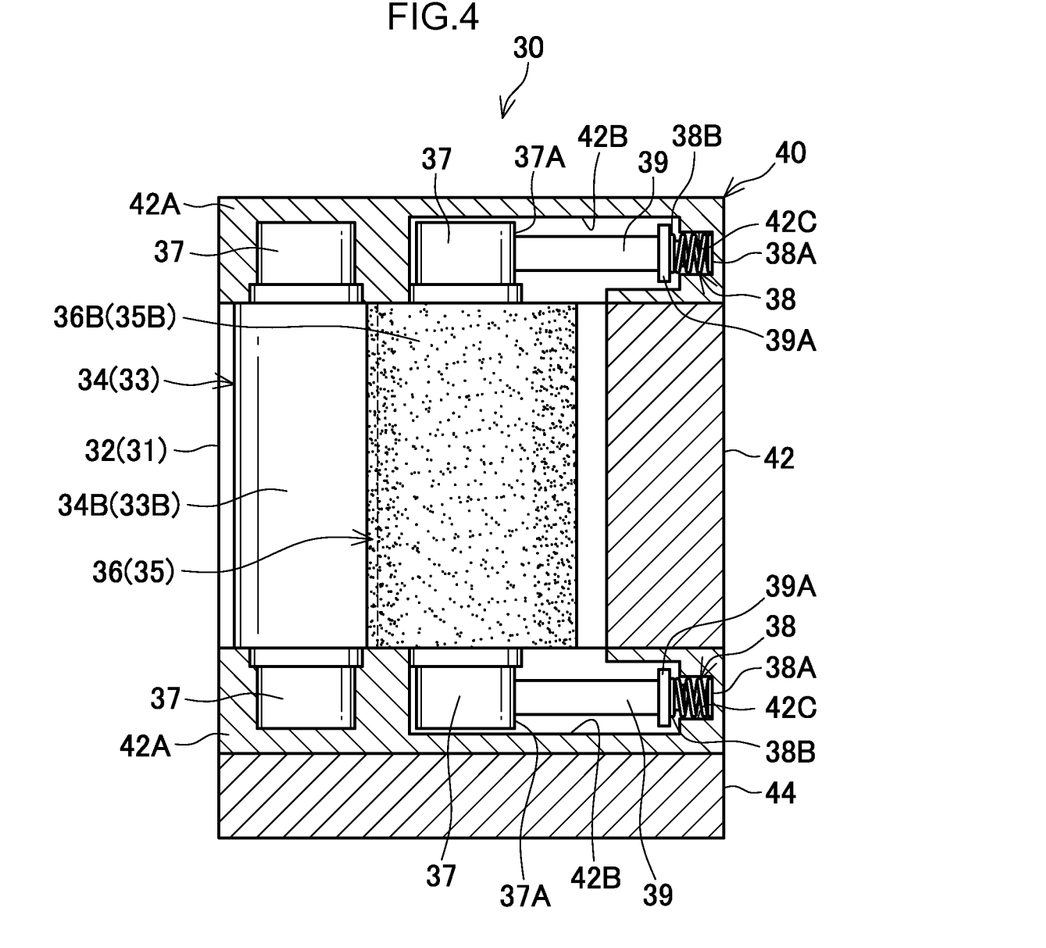
FIG. 4 is a side view showing the structures of the tape cleaning device of the first exemplary embodiment.
Figure 6:
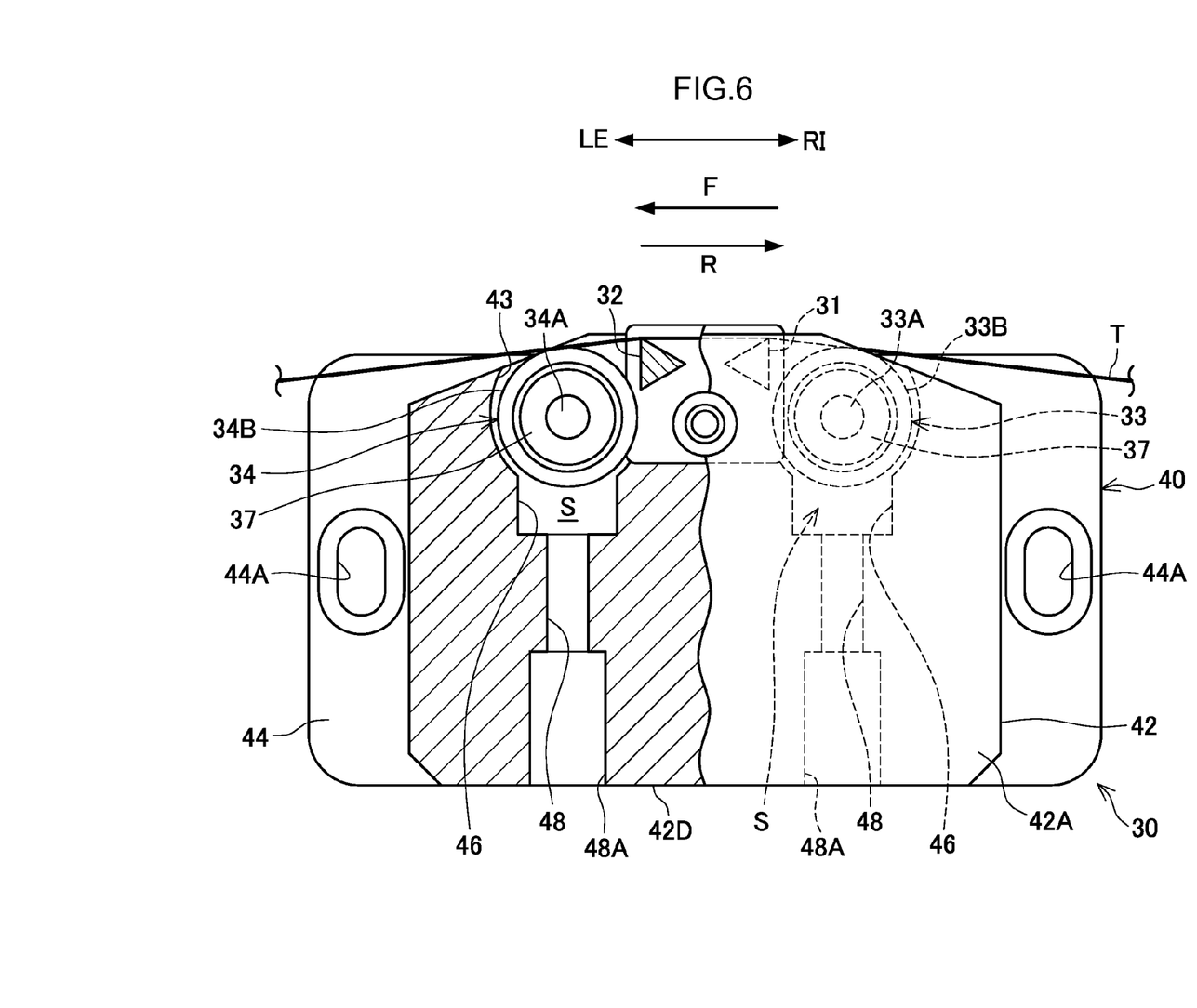
FIG. 6 is a plan view showing the structures of the tape cleaning device of the second exemplary embodiment.

Herebelow, exemplary embodiments relating to the present invention are described in detail in accordance with the drawings. For convenience in the descriptions, the arrow UP in FIG. 1 represents an upward direction, the arrow DO represents a downward direction, and a rotation axis direction of reels 10 and 20 according to the present exemplary embodiments is referred to as an up-and-down direction (or height direction). In FIG. 3 and FIG. 6, the arrow RI represents a rightward direction and the arrow LE represents a leftward direction. First, a drive device 50 in which reels 10 and 20 are non-removably provided is described in outline, and then the structure of a tape cleaning device 30 is described in detail.

—Outline of Drive Device—

The reels 10 and 20 according to the present exemplary embodiments are formed in the same shape of, for example, a synthetic resin such as polycarbonate (PC) or the like. As shown in FIG. 1, the reels 10 and 20 are provided as a pair inside a casing 52 (of which only a floor plate 54 and four support pillars 56 are shown in FIG. 1) that serves as a device main body of the drive device 50.

The reel 10 is used for feeding out a recording tape (a magnetic tape) T that serves as an information recording and replaying medium, and the reel 20 is used for taking up the recording tape T. While the running recording tape T fed out from the reel 10 is being taken up at the reel 20, the recording tape T slides against a head 60 that implements one or both of recording (writing) and replaying (reading) of data (information) to/from the recording tape T.

A plural number (eight in the drawing, in sets of four) of tape guides 58 are rotatably provided on the floor plate 54 at the two sides of the head 60. The recording tape T being fed out from the reel 10 and taken up at the reel 20 is guided by the tape guides 58.

The reels 10 and 20 are structured with, respectively, a reel hub 12 or 22 in a substantially cylinder shape, an annular upper flange 14 or 24 and an annular lower flange 16 or 26. The reel hub 12 or 22 is provided with, at a rotation center side thereof, an axial central portion 18 or 28 in a short cylinder shape that includes a top plate 19 or 29. The upper flange 14 or 24 is provided at an upper end portion side of the reel hub 12 or 22 and serves as a first flange. The lower flange 16 or 26 is provided at a lower end portion side of the reel hub 12 or 22 and serves as a second flange.

The recording tape T is wound round the outer periphery face of the reel hub 12 of the reel 10. Width direction end portions of the wound recording tape T are retained by the upper flange 14 and the lower flange 16. The recording tape T that has been fed out from the reel 10 is taken up onto the outer periphery face of the reel hub 22 of the reel 20, and the width direction end portions thereof are retained by the upper flange 24 and the lower flange 26.

The meaning of the term "substantially cylinder shape" as used in the present exemplary embodiments includes broadly cylindrical shapes in which the shapes of the outer periphery faces (winding faces) of the reel hubs 12 and 22 on which the recording tape T is wound are formed as bulging cylinder shapes or the like, hollow shapes that are not purely circular tube shapes, in which ribs are provided protruding from the inner periphery face sides of the reel hubs 12 and 22 or the like, and so forth.

A motor (not shown in the drawings) that, together with the reels 10 and 20, structures a tape drive mechanism is provided at the drive device 50. A pair of rotation transmission members (not shown in the drawings) transmit rotary driving force from a rotary shaft (not shown in the drawings) of the motor. The respective rotation transmission members are rotatably provided in a pair of aperture portions (not shown in the drawings) that are formed in the casing 52 (the floor plate 54) of the drive device 50.

Screw hole portions (not shown in the drawings) are formed in the axial central portions 18 and 28, along the circumferential directions of the reels 10 and 20. The reels 10 and 20 are integrally fastened and fixed to the rotation transmission members by screws 62 (see FIG. 1) being inserted into the screw hole portions and screwed into the rotation transmission members. Thus, a structure is formed in which the reels 10 and 20 are non-removably incorporated inside the casing 52 of the drive device 50.

—Structure of the Tape Cleaning Device of a First Exemplary Embodiment—

Now, structures of the tape cleaning device 30 are described in detail. The tape cleaning device 30 is disposed between the tape guides 58 at one or both of the upstream side and the downstream side relative to the head 60 in the tape running direction (in the structure shown in FIG. 1, at both sides). The tape cleaning device 30 cleans the recording tape T that is wound between the reels 10 and 20. First, a first exemplary embodiment is described.

As shown in FIG. 1 to FIG. 4, the tape cleaning device 30 according to the first exemplary embodiment is structured with a pair of left and right blades 31 and 32, a pair of left and right rollers 33 and 34, and a pair of left and right adhesive rollers 35 and 36. The blades 31 and 32 each touch against a surface (a recording surface) of the recording tape T that is running while being fed out or while being taken up, and scrape foreign bodies (contaminants) such as dust and the like from the surface of the recording tape T. The rollers 33 and 34 touch against the surface of the running recording tape T and rotate along with the running of the recording tape T. The foreign bodies scraped off by the blades 31 and 32 are transferred to the rollers 33 and 34. The adhesive rollers 35 and 36 serve as removal mechanisms that remove foreign bodies that have been transferred onto outer periphery faces 33B and 34B of the rollers 33 and 34, respectively, from the outer periphery faces 33B and 34B of the rollers 33 and 34.

The blades 31 and 32, the rollers 33 and 34, and the adhesive rollers 35 and 36 are disposed inside a housing 40 that is attachable to and detachable from the floor plate 54 of the drive device 50. In more detail, the housing 40 includes a substantially rectangular box-shaped main body 42 and a flat plate-shaped mounting platform 44. The main body 42 accommodates the blades 31 and 32, the rollers 33 and 34, and the adhesive rollers 35 and 36. The mounting platform 44 supports the main body 42. Screw hole portions 44A are formed in both of tape running direction end portions of the mounting platform 44. The screw hole portions 44A are for mounting the main body 42 to the floor plate 54 with the screws 62.

The screw hole portions 44A are formed as long holes that are elongated in a direction toward and away from the recording tape T that is stretched between the tape guides 58 (i.e., the thickness direction of the recording tape T, which is the direction orthogonal to the left-and-right direction of the plan view shown in FIG. 3). A mounting position of the tape cleaning device 30 relative to the recording tape T (i.e., disposition positions of the blades 31 and 32 and the rollers 33 and 34) may be adjusted by the screw hole portions 44A.

The main body 42 of the housing 40 includes an aperture portion 43 that opposes the surface of the recording tape T being guided by the tape guides 58. The blades 31 and 32 and the rollers 33 and 34 are exposed through the aperture portion 43. In more detail, the blades 31 and 32 are exposed through the aperture portion 43 between the roller 33 and the roller 34, and are fixed in the main body 42 in this state.

The blades 31 and 32 are formed of a ceramic or the like in substantially equilateral triangular column shapes (substantially equilateral triangle shapes in plan view), whose length directions are in the tape width direction. One of the pair of left and right blades (for example, the blade 31 at the right side of the plan view shown in FIG. 3) scrapes off foreign bodies at the surface of the running recording tape T when the tape is being fed out (running in the direction of arrow F in FIG. 3), and the other of the pair of left and right blades (the blade 32 at the left side of the plan view in the example shown in FIG. 3) scrapes off foreign bodies at the surface of the running recording tape T when the tape is being taken up (running in the direction of arrow R in FIG. 3).

In more detail, in the example in the plan view shown in FIG. 3, the blade 31 at the right side is disposed with a contact angle so as to scrape foreign bodies off the running recording tape T when the tape is being fed out (running in the direction of arrow F), and so as not to resist the running of the running recording tape T when the tape is being taken up (running in the direction of arrow R). Similarly, the blade 32 at the left side is disposed with a contact angle so as to scrape foreign bodies off the running recording tape T when the tape is being taken up (running in the direction of arrow R), and so as not to resist the running of the running recording tape T when the tape is being fed out (running in the direction of arrow F).

The rollers 33 and 34 are each formed in a cylindrical shape whose length direction is the tape width direction, of a urethane rubber or the like with a hardness (Shore A scale) of 50 to 90, and preferably of 60 to 80. In the example in the plan view shown in FIG. 3, the roller 33 at the right side is disposed at the downstream side in the running direction of the recording tape T when the tape is being taken up (the direction of arrow R) relative to the blade 32 at the left side, and the roller 34 at the left side is disposed at the downstream side in the running direction of the recording tape T when the tape is being fed out (the direction of arrow F) relative to the blade 31 at the right side.

In more detail, bearings 37 are provided at predetermined positions of the main body 42. A support shaft 33A of the roller 33, whose axial direction is in the tape width direction, is rotatably supported by the bearings 37. The support shaft 33A is supported such that, when the tape is being fed out, the recording tape T that is running (in the direction of arrow F) comes into contact with the outer periphery face 33B of the roller 33 just before coming into contact with the blade 31 at the right side. Thus, the roller 33 passively rotates along with the recording tape T that is touching against the outer periphery face 33B with friction therebetween.

Similarly, others of the bearings 37 are provided at predetermined positions of the main body 42. A support shaft 34A of the roller 34, whose axial direction is in the tape width direction, is rotatably supported by the bearings 37. The support shaft 34A is supported such that, when the tape is being taken up, the recording tape T that is running (in the direction of arrow R) comes into contact with the outer periphery face 34B of the roller 34 just before coming into contact with the blade 32 at the left side. Thus, the roller 34 passively rotates along with the recording tape T that is touching against the outer periphery face 34B with friction therebetween.

That is, when the tape is being fed out, the running recording tape T comes into contact with the outer periphery face 33B of the roller 33, and then comes into contact with the blade 31 and foreign bodies are scraped off by the blade 31. When the tape is being taken up, the running recording tape T comes into contact with the outer periphery face 34B of the roller 34, and then comes into contact with the blade 32 and foreign bodies are scraped off by the blade 31. Thus, in this structure, contact angles of the recording tape T coming into contact with the blades 31 and 32 are controlled by the rollers 33 and 34.

The adhesive rollers 35 and 36 are pressed against the rollers 33 and 34, respectively. The adhesive rollers 35 and 36 are formed of a material such as silicone rubber or the like with a hardness (Shore A scale) lower than that of the rollers 33 and 34, being a hardness of 20 to 50 and preferably of 30 to 40.

Outer periphery faces 35B and 36B of the adhesive rollers 35 and 36, respectively, are formed as adhesive surfaces that are provided with adhesive force at a level sufficient to capture dust (a level that may be restored by washing with water). Support shafts 35A and 36A of the adhesive rollers 35 and 36, whose axial directions are in the tape width direction, are rotatably supported at others of the bearings 37, which are supported in long hole portions 42B (see FIG. 2 and FIG. 3) of the main body 42. The adhesive rollers 35 and 36 passively rotate along with rotation of the rollers 33 and 34.

In more detail, the long hole portions 42B are in recess shapes that are respectively formed in wall portions 42A of the main body 42 that oppose one another in the tape width direction. The long hole portions 42B have substantially oval shapes whose length directions are in a direction (the thickness direction of the recording tape T) orthogonal to the left-and-right direction of the plan view shown in FIG. 3. The bearings 37 that are accommodated and retained in the long hole portions 42B are urged towards the sides at which the rollers 33 and 34 are disposed by coil springs 38, which serve as urging members, via shafts 39 that extend in the radial directions of the support shafts 35A and 36A.

In more detail, one end portions 38A of the coil springs 38 are accommodated in retention portions 42C that are formed in recess shapes in the wall portions 42A of the main body 42. Other end portions 38B of the coil springs 38 are attached in abutting states to flat plate portions 39A that are formed at axial direction one end portions of the shafts 39. The axial direction other end portions of the shafts 39 are integrally attached to cover bodies 37A of the bearings 37.

Thus, a structure is formed in which the outer periphery faces 35B and 36B that are the adhesive surfaces of the adhesive rollers 35 and 36 touch against the outer periphery faces 33B and 34B of the rollers 33 and 34 with predetermined pressures (governed by the urging forces of the coil springs 38), and the adhesive rollers 35 and 36 passively rotate along with the rotations of the rollers 33 and 34.

—Operation of the Tape Cleaning Device of the First Exemplary Embodiment—

Now, operations of the tape cleaning device 30 of the first exemplary embodiment with the above structure are described.

When the recording tape T is being fed out from the reel 10 to the reel 20, foreign bodies on the surface of the recording tape T are scraped off by the blade 31 at the right side in the example shown in FIG. 3. As foreign bodies accumulate on the blade 31, a portion of the foreign bodies re-adhere to the surface of the recording tape T, the re-adhered foreign bodies pass over the blades 31 and 32 in this order, and the foreign bodies transfer (move) from the surface of the recording tape T onto the outer periphery face 34B of the roller 34 that is disposed at the downstream side in the running direction of the recording tape T (the direction of arrow F) relative to the blade 32.

At this time, the roller 34 is passively rotating along with the running of the recording tape T, and the adhesive roller 36 is pressed against the roller 34 and passively rotates. Consequently, the foreign bodies that have been transferred onto the outer periphery face 34B of the roller 34 are successively attached to the outer periphery face 36B (the adhesive surface) of the adhesive roller 36, and are efficiently removed from the outer periphery face 34B of the roller 34.

Thus, because the adhesive roller 36 is not in direct contact with (acting on) the running recording tape T, the tape cleaning device 30 may clean the surface of the recording tape T without having adverse effects on the running of the recording tape T and without causing damage to the recording tape T. The foreign bodies that have been removed from the outer periphery face 34B of the roller 34 stay attached to the outer periphery face 36B of the adhesive roller 36, and do not leak to the exterior from inside the main body 42 of the housing 40.

When the recording tape T is being taken up from the reel 20 to the reel 10, foreign bodies on the surface of the recording tape T are scraped off by the blade 32 at the left side in the example shown in FIG. 3. As foreign bodies accumulate on the blade 32, a portion of the foreign bodies re-adhere to the surface of the recording tape T, the re-adhered foreign bodies pass over the blades 32 and 31 in this order, and the foreign bodies transfer (move) from the surface of the recording tape T onto the outer periphery face 33B of the roller 33 that is disposed at the downstream side in the running direction of the recording tape T (the direction of arrow R) relative to the blade 31.

At this time, the roller 33 is passively rotating along with the running of the recording tape T, and the adhesive roller 35 is pressed against the roller 33 and passively rotates. Consequently, the foreign bodies that have been transferred onto the outer periphery face 33B of the roller 33 are successively attached to the outer periphery face 35B (the adhesive surface) of the adhesive roller 35, and are efficiently removed from the outer periphery face 33B of the roller 33.

Thus, because the adhesive roller 35 is not in direct contact with (acting on) the running recording tape T, the tape cleaning device 30 may clean the surface of the recording tape T without having adverse effects on the running of the recording tape T and without causing damage to the recording tape T. The foreign bodies that have been removed from the outer periphery face 33B of the roller 33 stay attached to the outer periphery face 35B of the adhesive roller 35, and do not leak to the exterior from inside the main body 42 of the housing 40.

As described hereabove, in this structure, the rollers 33 and 34 are passively rotated by the recording tape T touching against the outer periphery faces 33B and 34B with friction and running, and the adhesive rollers 35 and 36 are passively rotated by the outer periphery faces 35B and 36B pressing against the outer periphery faces 33B and 34B of the rollers 33 and 34. Thus, the rollers 33 and 34 and the adhesive rollers 35 and 36 are constituted with a simpler structure than with dedicated separate structures that would be driven to rotate by a driving mechanism that is not shown in the drawings.

Further, the tape cleaning device 30 is formed as a unit in which the blades 31 and 32, the rollers 33 and 34, and the adhesive rollers 35 and 36 are provided inside the housing 40. Therefore, adjustments to suit cleaning conditions of the recording tape T may be easily performed outside the drive device 50 (i.e., before installation in the drive device 50).

Moreover, because the tape cleaning device 30 is formed as a unit, if the adhesive force of the outer periphery faces 35B and 36B (the adhesive surfaces) of the adhesive rollers 35 and 36 deteriorates, the tape cleaning device 30 may be replaced by replacing the whole housing 40. Therefore, the recording tape T wound between the reels 10 and 20 that are non-removably provided in the drive device 50 may be reliably cleaned at all times.

Because the tape cleaning device 30 is provided at both sides of the head 60, when the recording tape T is being fed out and when the recording tape T is being taken up, the recording tape T may at all times be cleaned at the tape running direction upstream side relative to the head 60. Therefore, a cleaning mechanism for the head 60 may be rendered unnecessary, and costs may be reduced in comparison with a structure in which a cleaning mechanism for the head 60 is provided.

—Structure of the Tape Cleaning Device of a Second Exemplary Embodiment—

Now, the tape cleaning device 30 of a second exemplary embodiment is described. Herein, portions that are similar to those in the tape cleaning device 30 according to the first exemplary embodiment described above are assigned the same reference numerals, and descriptions thereof are omitted as appropriate.

Figure 5:
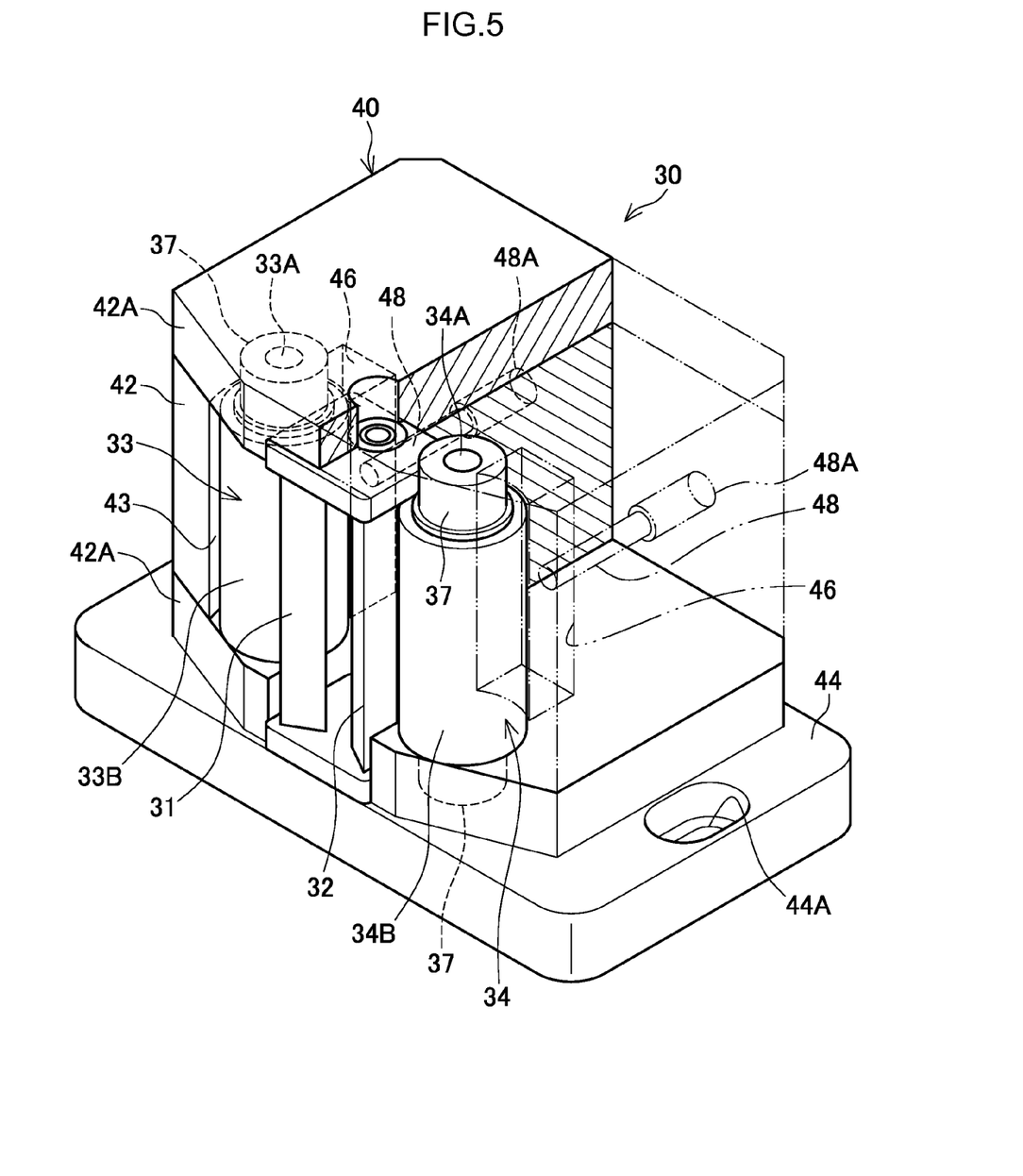
FIG. 5 is a perspective view showing structures of a tape cleaning device of a second exemplary embodiment.
Figure 7:
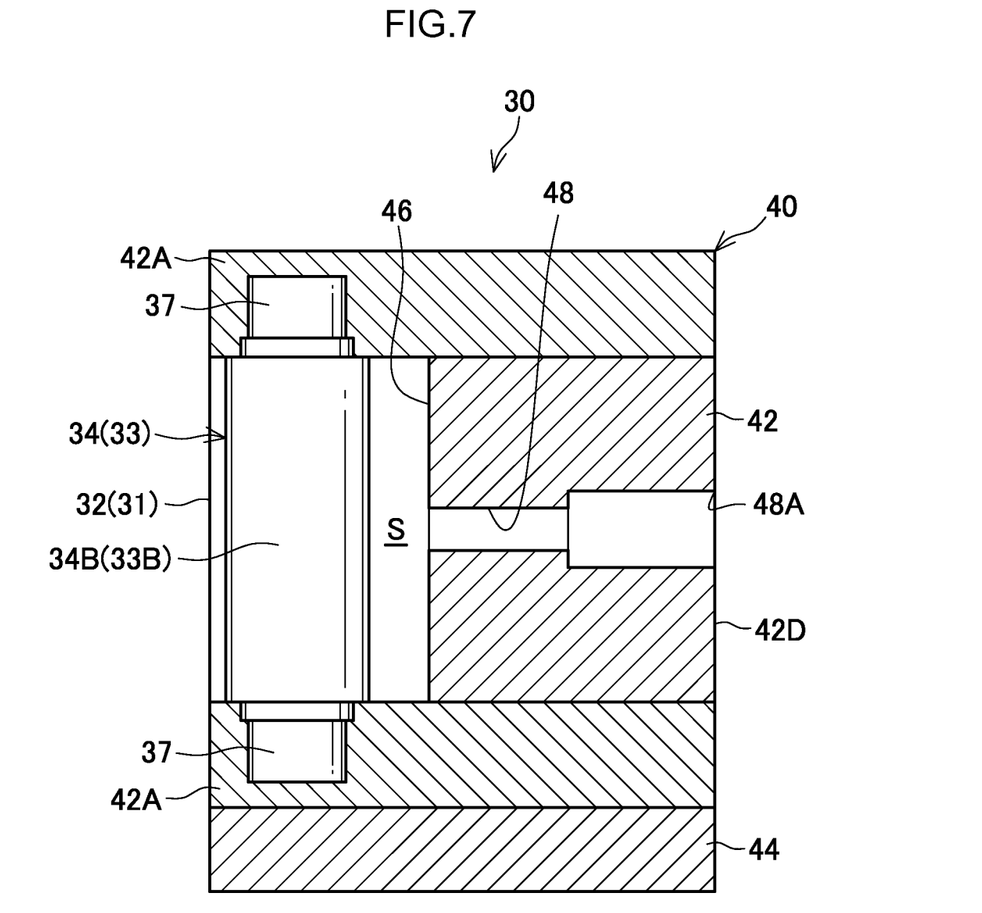
FIG. 7 is a side view showing the structures of the tape cleaning device of the second exemplary embodiment.

As shown in FIG. 5 to FIG. 7, the second exemplary embodiment differs from the first exemplary embodiment described above only in that suction portions 46 are formed in the main body 42 to serve as the removal mechanisms instead of the adhesive rollers 35 and 36. The suction portions 46 form suction spaces S between the suction portions 46 and the outer periphery faces 33B and 34B of the rollers 33 and 34. The suction spaces S are in fluid communication with a suction device, which is not shown in the drawings. The suction portions 46 are formed substantially at the opposite side of the rollers 33 and 34 from the side thereof at which the blades 31 and 32 are disposed.

In more detail, each suction portion 46 is formed in a substantially rectangular recess shape with the same height as the height (length in the axial direction) of the outer periphery faces 33B and 34B of the rollers 33 and 34 or with a slightly greater height, and with a width slightly smaller than the diameter of each of the rollers 33 and 34. The suction portions 46 are structured such that the suction spaces S may be formed over the whole axial direction lengths of the outer periphery faces 33B and 34B of the rollers 33 and 34.

A penetrating hole 48 is formed in a substantially central portion in the height direction of each suction portion 46 (the axial direction of the rollers 33 and 34). Each penetrating hole 48 communicates with the exterior of the housing 40. An insertion aperture 48A with a large diameter is formed at an outlet side of each penetrating hole 48 (i.e., the side of a wall portion 42D that is at the opposite side of the main body 42 from the side thereof at which the aperture portion 43 is formed). Each insertion aperture 48A is for the insertion of a distal end portion of a communication pipe (not shown in the drawings) of a suction device that is provided outside the housing 40 (and the drive device 50).

Thus, by the distal end portions of the communication pipes of the suction device being inserted into and fixed in the insertion apertures 48A, and the suction device being operated, negative pressures may be produced inside the suction portions 46, which is to say inside the suction spaces S, via the penetrating holes 48. Thus, foreign bodies that have transferred (moved) onto the outer periphery faces 33B and 34B of the rollers 33 and 34 may be suctioned and removed.

—Operation of the Tape Cleaning Device of the Second Exemplary Embodiment—

Now, operations of the tape cleaning device 30 of the second exemplary embodiment with the above structure are described. Descriptions of operations in common with the tape cleaning device 30 of the first exemplary embodiment described above are omitted as appropriate.

When the recording tape T is being fed out from the reel 10 to the reel 20, foreign bodies on the surface of the recording tape T are scraped off by the blade 31 at the right side in the example shown in FIG. 6. As foreign bodies accumulate on the blade 31, a portion of the foreign bodies re-adhere to the surface of the recording tape T, the re-adhered foreign bodies pass over the blades 31 and 32 in this order, and the foreign bodies transfer (move) from the surface of the recording tape T onto the outer periphery face 34B of the roller 34 that is disposed at the downstream side in the running direction of the recording tape T (the direction of arrow F) relative to the blade 32.

Here, the suction space S is formed between the outer periphery face 34B of the roller 34 and the suction portion 46, over the whole axial direction length of the roller 34. Negative pressure is generated in the suction space S by the penetrating hole 48 that is connected in fluid communication with the communication pipe of the suction device. Consequently, the foreign bodies that have been transferred onto the outer periphery face 34B of the roller 34 are successively suctioned into the penetrating hole 48 by the negative pressure, and are efficiently removed from the outer periphery face 34B of the roller 34.

Thus, because the suction portion 46 is not a structure that applies suction force directly to the running recording tape T, the tape cleaning device 30 may clean the surface of the recording tape T without having adverse effects on the running of the recording tape T and without causing damage to the recording tape T. The foreign bodies that have been removed from the outer periphery face 34B of the roller 34 are fed through the communication pipe connected in fluid communication with the penetrating hole 48 to a dust collection unit (not shown in the drawings) of the suction device.

When the recording tape T is being taken up from the reel 20 to the reel 10, foreign bodies on the surface of the recording tape T are scraped off by the blade 32 at the left side in the example shown in FIG. 6. As foreign bodies accumulate on the blade 32, a portion of the foreign bodies re-adhere to the surface of the recording tape T, the re-adhered foreign bodies pass over the blades 32 and 31 in this order, and the foreign bodies transfer (move) from the surface of the recording tape T onto the outer periphery face 33B of the roller 33 that is disposed at the downstream side in the running direction of the recording tape T (the direction of arrow R) relative to the blade 31.

Here, the suction space S is formed between the outer periphery face 33B of the roller 33 and the suction portion 46, over the whole axial direction length of the roller 33. Negative pressure is generated in the suction space S by the penetrating hole 48 that is connected in fluid communication with the communication pipe of the suction device. Consequently, the foreign bodies that have been transferred onto the outer periphery face 33B of the roller 33 are successively suctioned into the penetrating hole 48 by the negative pressure, and are efficiently removed from the outer periphery face 33B of the roller 33.

Thus, because the suction portion 46 is not a structure that applies suction force directly to the running recording tape T, the tape cleaning device 30 may clean the surface of the recording tape T without having adverse effects on the running of the recording tape T and without causing damage to the recording tape T. The foreign bodies that have been removed from the outer periphery face 33B of the roller 33 are fed through the communication pipe connected in fluid communication with the penetrating hole 48 to the dust collection unit (not shown in the drawings) of the suction device.

In addition, because the tape cleaning device 30 according to the second exemplary embodiment has a structure in which the suction spaces S are formed by the suction portions 46 and foreign bodies are removed by air suction, deteriorating components such as the adhesive rollers 35 and 36 are not present. Therefore, the tape cleaning device 30 according to the second exemplary embodiment may not need replacing, and the recording tape T wound between the reels 10 and 20 that are non-removably provided in the drive device 50 may be reliably cleaned at all times.

Hereabove, the tape cleaning device 30 and the drive device 50 according to the present exemplary embodiments have been described in accordance with the drawings. However, the tape cleaning device 30 and drive device 50 according to the present exemplary embodiments are not limited to the illustrated structures and may be suitably modified in design within a scope not departing from the spirit of the present invention.

For example, the rollers 33 and 34 are not limited to rollers formed in cylindrical shapes, whose length directions are the tape width direction, of a resin material such as polyurethane or the like. The rollers 33 and 34 may be formed of a metallic material, in cylindrical shapes whose length directions are the tape width direction. Further, the removal mechanisms of the tape cleaning device 30 are not limited to the adhesive rollers 35 and 36 and the suction portions 46.

In the structure shown in FIG. 1, the two tape cleaning devices 30—which are each provided with the blade 31 that scrapes when the recording tape T is being fed out, the roller 34 and the adhesive roller 36, and with the blade 32 that scrapes when the recording tape T is being taken up, the roller 33 and the adhesive roller 35—are disposed between the tape guides 58 at both the upstream sides and the downstream sides of the head 60 in the tape running directions.

However, a structure is possible in which the blade 31 that scrapes when the recording tape T is being fed out, the roller 34 and the adhesive roller 36 on the one hand, and the blade 32 that scrapes when the recording tape T is being taken up, the roller 33 and the adhesive roller 35 on the other hand, are disposed at the respective tape running direction upstream sides relative to the head 60.

That is, a structure may be formed in which the tape cleaning device 30 that is disposed between the tape guides 58 between the head 60 and the reel 10 is equipped with the blade 31, the roller 34 and the adhesive roller 36, and the tape cleaning device 30 that is disposed between the tape guides 58 between the head 60 and the reel 20 is equipped with the blade 32, the roller 33 and the adhesive roller 35.

What is claimed is:

1. A tape cleaning device, comprising:
   a blade that, while touching a recording tape that is running, scrapes foreign bodies from the recording tape;
   a roller that touches the recording tape and rotates in conjunction with the running of the recording tape, and that is structured to receive the foreign bodies scraped off by the blade and being transferred to the roller via the recording tape; and
   a removal mechanism that removes, from the roller, the foreign bodies that have been transferred to the roller.

2. The tape cleaning device according to claim 1, wherein the removal mechanism comprises a suction portion that forms a suction space between the suction portion and the roller and that removes the foreign bodies on the roller by suction force, the suction portion being communicated with a suction device.

3. The tape cleaning device according to claim 1, wherein the transfer of the foreign bodies from the blade to the roller is done by accumulating the foreign bodies scrapped off by the blade on the recording tape between the blade and the roller.

4. The tape cleaning device according to claim 1, wherein the removal mechanism comprises an adhesive roller that, while touching the roller and rotating, removes the foreign bodies on the roller by adhesive force.

5. The tape cleaning device according to claim 4, wherein the adhesive roller is structured so as to rotate in conjunction with the rotation of the roller.

6. The tape cleaning device according to claim 4, further comprising a housing in which the blade, the roller and the adhesive roller are disposed.

7. A drive device, comprising:
   a head that, while touching a recording tape that is running, implements at least one of writing or reading of information at the recording tape;
   a tape drive mechanism that causes the recording tape to run in reciprocal directions; and,
   the tape cleaning device according to claim 1, disposed at least at one side of the head in the recording tape running directions.

8. The drive device according to claim 7, wherein the tape drive mechanism includes a pair of reels that retain the recording tape so as to be capable of feeding out and taking up the recording tape, the pair of reels being non-removably incorporated in a main body of the drive device.

9. The drive device according to claim 7, wherein the tape cleaning device is provided at both sides of the head.

10. The drive device according to claim 7, wherein the tape cleaning device is detachable from a main body of the drive device.

* * * * *